United States Patent
Scharfenberger et al.

(10) Patent No.: US 12,488,593 B2
(45) Date of Patent: Dec. 2, 2025

(54) CORRECTION OF IMAGES FROM A PANORAMIC-VIEW CAMERA SYSTEM IN THE CASE OF RAIN, INCIDENT LIGHT AND CONTAMINATION

(71) Applicant: Continental Autonomous Mobility Germany GmbH, Ingolstadt (DE)

(72) Inventors: Christian Scharfenberger, Lindau (DE); Michelle Karg, Lindau (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 40 days.

(21) Appl. No.: 18/257,659

(22) PCT Filed: Dec. 3, 2021

(86) PCT No.: PCT/DE2021/200236
§ 371 (c)(1),
(2) Date: Jun. 15, 2023

(87) PCT Pub. No.: WO2022/128014
PCT Pub. Date: Jun. 23, 2022

(65) Prior Publication Data
US 2024/0029444 A1    Jan. 25, 2024

(30) Foreign Application Priority Data
Dec. 15, 2020   (DE) .................... 10 2020 215 860.6

(51) Int. Cl.
*G06V 20/56*    (2022.01)
*B60W 40/02*    (2006.01)
*G06V 10/82*    (2022.01)

(52) U.S. Cl.
CPC ............. *G06V 20/56* (2022.01); *B60W 40/02* (2013.01); *G06V 10/82* (2022.01); *B60W 2555/20* (2020.02)

(58) Field of Classification Search
CPC ................ B60R 21/0134; B60R 11/04; B60R 2021/0004; B60R 2021/0006;
(Continued)

(56) References Cited

U.S. PATENT DOCUMENTS

2019/0197400 A1 *  6/2019  Zhang .................... G06F 16/35
2020/0051217 A1    2/2020  Shen
(Continued)

FOREIGN PATENT DOCUMENTS

CN         110956597 A        4/2020
DE    10 2018 126 112 A1     4/2020
(Continued)

OTHER PUBLICATIONS

German Search Report dated Oct. 12, 2021 for the counterpart German Patent Application No. 10 2020 215 860.6.
(Continued)

*Primary Examiner* — Masum Billah
(74) *Attorney, Agent, or Firm* — Buchanan Ingersoll & Rooney PC

(57) ABSTRACT

The invention relates to correcting input image data, from a plurality of cameras of a vehicle panoramic-view system. includes: capturing input image data by the cameras, which are negatively influenced by rain, incident light and/or dirt, and providing to a trained artificial neural network, converting, by the trained network, the input image data into corrected output image data without negative influence, determining a certainty measure which is dependent on the degree of wetting by water, incident light and/or contamination for an image of the input image data, and character-
(Continued)

izing the certainty of the trained network that the image correction of the network is accurate, and outputting, by the trained network, the output image data and the determined certainty measure. The method advantageously allows object recognition when cameras are fogged up and generation of an image data stream for human and computer vision from a network for an optimized correspondence search.

17 Claims, 3 Drawing Sheets

(58) Field of Classification Search
CPC ............ B60R 2021/0018; G06N 3/045; G06N 20/00; G06N 3/006; G06N 3/049
USPC .......................................................... 348/148
See application file for complete search history.

(56) References Cited

U.S. PATENT DOCUMENTS

| | | | |
|---|---|---|---|
| 2020/0098095 A1 | 3/2020 | Borcs et al. | |
| 2020/0204732 A1 | 6/2020 | Yadav | |
| 2020/0273153 A1* | 8/2020 | Hiramaki | G06T 5/60 |
| 2020/0342574 A1* | 10/2020 | Meinke | G06T 5/70 |

FOREIGN PATENT DOCUMENTS

| | | |
|---|---|---|
| DE | 102019205962 A1 | 10/2020 |
| JP | 2017092622 A | 5/2017 |
| JP | 2020138569 A | 9/2020 |
| WO | 2013083120 A1 | 6/2013 |

OTHER PUBLICATIONS

The International Search Report and the Written Opinion of the International Searching Authority mailed on Apr. 22, 2022 for the counterpart PCT Application No. PCT/DE2021/200236.

Xing Liu et al., "Dual Residual Networks Leveraging the Potential of Paired Operations for Image Restoration", 2019 IEEE/CVF Conference on Computer Vision and Pattern Recognition (CVPR), Jun. 15, 2019.

Horia Porav et al., "Rainy screens: collecting rainy datasets, indoors", Published Mar. 10, 2020, Computer Science.

Horia Porav et al., "I Can See Clearly Now : Image Restoration via De-Raining", 2019 Intl. Conf. on Robotics and Automation (ICRA), May 20, 2019, arXiv:1901.00893 [cs.CV], Jan. 3, 2019.

Stefano Alletto et al., "Adherent Raindrop Renoval- with Self-Supervised Attention Maps and Spatio-Temporal Generative Adversarial Networks", 2019 IEEE/cvF International Conference on Computer Vision Workshop (ICCVW), Oct. 27, 2019.

Notice of Reasons for Refusal drafted May 29, 2024 for the counterpart Japanese Patent Application No. 2023-530226 and machine translation of same.

R.Chen et al., "A Deep Learning Framework for Joint Image Restoration and Recognition", Circuits Systems and Signal Processing, Mar. 2020, vol. 39, pp. 1561-1580, DOI: 10.1007/s00034-019-01222-x. Cited in NPL Cite No. 1.

Office Action (The First Office Action) issued Jul. 10, 2025, by the State Intellectual Property Office of People's Republic of China in corresponding Chinese Patent Application No. 202180082534.1 and an English translation of the Office Action. (19 pages).

* cited by examiner

CORRECTION OF IMAGES FROM A PANORAMIC-VIEW CAMERA SYSTEM IN THE CASE OF RAIN, INCIDENT LIGHT AND CONTAMINATION

CROSS REFERENCE TO RELATED APPLICATIONS

The present application is a National Stage Application under 35 U.S.C. § 371 of International Patent Application No. PCT/DE2021/200236 filed on Dec. 3, 2021, and claims priority from German Patent Application No. 10 2020 215 860.6 filed on Dec. 15, 2020, in the German Patent and Trademark Office, the disclosures of which are herein incorporated by reference in their entireties.

FIELD OF INVENTION

The invention relates to a machine learning method, a method and an apparatus for correcting image data from a plurality of vehicle cameras of a panoramic-view system in case of rain, incident light or contamination, for example of a vehicle-mounted panoramic-view camera system.

BACKGROUND

Today's vehicles, and future vehicles, are/will be equipped with camera-based assistance systems which serve to recognize objects in order to avoid collisions and to recognize road boundaries to keep the vehicle within the lane. To this end, forward-looking cameras are used, for example. In addition to forward-looking cameras, surround-view (panoramic-view) or satellite cameras are likewise used, which in any arrangement on a vehicle realize detection functions for driving, parking or for a visualization in the near and far 360° environment (or parts thereof) around the vehicle.

Concepts exist for forward-looking cameras which include a detection function for detecting rain. Combined with camera-based daylight recognition for controlling the vehicle headlights, a so-called rain light detector can be realized with a camera, which rain light detector recognizes rain on the windshield and activates the windshield wipers, for example.

The recognition algorithms based on these camera systems already partially combine approaches of classical image processing with approaches from machine learning, in particular deep learning. Classical approaches to recognizing objects or structures as part of the image processing are based on manually selected features, while approaches based on deep learning establish and optimize relevant features in the training method itself.

The camera systems indicated above exhibit degradation both in the recognition of objects and in the representation of the surroundings or objects, which occurs, however, as soon as the visibility in a situation is negatively influenced by rain, incident light or dirt If the view of the front camera which is installed, for example, in the base of the interior mirror is restricted by water drops on the windshield or dirt, visibility can be restored by operating the windshield wipers. The precondition for this is that the installation position of the camera is in the wiping range of the windshield wipers.

Due to the increasing degree of automation of vehicles and driving functions, an increase in the number of forward-looking cameras can be advantageous. These can not only be mounted, in a centered manner, in the base of the mirror, but as satellite cameras in the proximity of the A pillar in the upper corners of a windshield. The regions are more critical for detection functionalities since they are located outside the wiping range of the windshield wipers. Visibility restricted by raindrops or dirt has an adverse effect on detection functions of the satellite cameras.

As the degree of automation of vehicles increases to SAE Level 4/Level 5, cameras mounted on the sides of a vehicle will be/are increasingly used, which, in addition to displaying the surroundings, also serve to detect lateral objects. The cameras are frequently mounted on the outside of the vehicle, e.g., in the region of the external mirrors. If the (outer) lenses of the cameras are wet due to water drops or covered with dirt, the display or detection functionality can also be very restricted here. Due to the lack of cleaning possibilities such as windshield wipers, this leads to degradation or a failure of a system.

Reversing cameras which, for the most part, are installed above the license plate and get dirty very quickly, are indicated as a final example. Here as well, rain or dust can cause fogging, which makes a clean display difficult.

While CNN-based methods for object recognition are to the greatest possible extent able to compensate for contamination or wetting of the lenses by water drops, at least up to a certain extent, methods for object recognition based on image features such as, e.g., optical flow or structure from motion, suffer severe degradation due to contamination.

Algorithmic methods for detecting dirt or precipitation on the outer lens of a camera or on the windshield of a vehicle by means of image processing are known.

WO 2013/083120 A1 discloses a method for evaluating image data from a vehicle camera, in which information about raindrops on a windshield within the field of view of the vehicle's camera is taken into account during the evaluation of the image data. The information about raindrops can, for its part, be determined from the image data. A recognition of objects, which then takes account of the information in a targeted manner, is indicated as an example of the evaluation of the image data. For example, the influence on the edges seen by the camera (light/dark or color transitions) can be estimated from a recognized rain intensity. Edge-based evaluation methods can be adjusted accordingly in their threshold values. In particular, a quality criterion of the image data can be derived from the information, which is then taken into account during the evaluation of the image data.

In "I Can See Clearly Now: Image Restoration via De-Raining", 2019 IEEE Int. Conference on Robotics and Automation (ICRA), Montreal, Canada, pages 7087-7093, accessed on Jul. 13, 2020 at: http://www.robots.ox.ac.uk/~mobile/Papers/ICRA19_porav.pdf H. Porav et al. demonstrate a method for improving segmentation tasks on images which are negatively influenced by adherent raindrops or streaks. To this end, a stereo dataset was generated, in which one lens was negatively influenced by real water drops and the other lens was clear of negative influences. The dataset was used to train a "denoising generator" in order to remove the effect of the water drops, in the context of image reconstruction and road marking segmentation.

SUMMARY

A system would be desirable which algorithmically offers an enhancement of the images despite contamination, incident light or water drops, for example in order to improve downstream object recognition and, additionally, makes possible a function for rain and light recognition (rain+light detection).

It is the object of the present disclosure to provide solutions for this.

The object is addressed by the subject-matter of the independent claims. Advantageous embodiments are the subject-matter of the dependent claims, the following description as well as the figures.

A method for machine learning according to the present disclosure relates to an image correction of input image data from a plurality of cameras of a panoramic-view system, which are negatively influenced by rain, incident light and/or dirt, into corrected output image data by means of an artificial neural network. The learning is effected with a multiplicity of pairs of training images in such a way that, in each case, a first image (or first simultaneously captured images) negatively influenced by rain, incident light and/or dirt is (are) provided at the input of the artificial neural network and a second image (or second nominal images to be attained simultaneously) of the same scene without negative influence is (are) provided as the nominal output image. The artificial neural network is designed in such a way that it determines a certainty measure c which is dependent on the degree of wetting by water, incident light and/or contamination for an input image. The network can be designed, for example, by a corresponding design or a corresponding architecture of the artificial neural network. Following the conclusion of the machine learning, the artificial neural network can establish and output the certainty measure c for a new input image (or for each of the simultaneously captured input images of the multiple cameras). That is to say that the certainty measure c is dependent on the degree of the negative influence caused by wetting with rain or water, by incident light, and/or by contamination and, during utilization of the trained network, characterizes the certainty that an image correction is accurate.

In other words, the certainty measure c characterizes, to a certain extent, the "(un)certainty" with which an image correction is effected by the trained neural network. The certainty measure c is, in practice, a measure of the certainty of the network in its calculated output (i.e., the image correction carried out by the network).

The artificial neural network can, for example, be a convolutional neural network (CNN).

As a general rule, the conversion into output image data without negative influence includes the conversion into output image data having a reduced negative influence.

The camera can be, for example, a (monocular) camera, which is fastened in or on a vehicle, which captures the environment of the vehicle. An example of such a vehicle-mounted camera is a camera arranged behind the windshield in the interior of the vehicle, which can capture and map the region of the vehicle surroundings lying in front of the vehicle through the windshield.

The effect of a negative influence on a camera image by rain, incident light or dirt is similar in that it results in (local) blurring in the image. In all of these cases, an image correction which reduces or eliminates this blurriness in the image is desirable.

According to an embodiment, at least one factor d is determined as a measure of the difference between the corrected output image and the negatively influenced input image and is provided to the artificial neural network as part of the training. The factor d is taken into account by the artificial neural network during learning, for example in such a way that the neural network trains the linking of the input image, output image and factor d. As a result, the trained network can later estimate or establish a factor d for a currently captured negatively influenced camera image and can produce (or reconstruct) an output image which has been greatly corrected accordingly. That is to say that, following the conclusion of the training, a factor d can be predefined for the trained neural network, for example, and, as a result, the degree of correction of the currently captured camera image can be controlled.

The factor d can be determined, for example, by means of a local comparison of an undisturbed image with that of an image negatively influenced by rain or dirt. In this case, the factor d can be established with the help of 2D filters which can be mapped, for example, in the input layers of an artificial neural network.

In a simple exemplary embodiment, the factor d can be represented as the variance of a 2D low-pass filter. Alternatively, more complex contrast values (structural similarity) or correlations (sum of absolute distances—SAD, sum of squared distances—SSD, zero-means normalized cross correlation—ZNCC), which are calculated from the two images with local filters, are equally conceivable.

For example, a disturbed image is created in the event of a camera lens being contaminated by rain or dirt, which may possibly make object recognition more difficult. As part of the machine learning method, a factor d can be established from a comparison of the nominal output image and the associated negatively influenced input image. This can be established in advance, i.e., a factor d already exists for each pair of training images. Alternatively, the factor d can be established purely on the basis of the pairs of training images as part of the learning method.

A value can be provided by the factor d, which indicates the degree of a possible reconstruction of the corrected image and is also given to subsequent image processing or image display functions. For example, a low value can indicate a high correction, while a high value can indicate a low correction for the further processing stages and can be taken into account when determining the quality of the produced object data—just like the certainty measure c.

In an embodiment, the pairs of training images are produced in that, in each case, a first image negatively influenced by rain, incident light and/or dirt (in the optical path of the camera) and a second image without negative influence are acquired with different exposure times simultaneously or immediately after one another with the cameras, or are captured by the cameras.

In an embodiment, (only) one artificial neural network is trained jointly or simultaneously for all of the vehicle cameras.

A sequence of consecutive images can in each case be used for each individual camera for the joint training.

The temporal correlation of images can be taken into account in a profitable manner during training and/or during the utilization of the trained network.

Information about image features and the nominal output image data thereof can be used, which are captured at a point in time t by a front camera and at a later point in time by a side camera or the rear camera. As a result, training can be provided to ensure that an object having certain image features has an identical brightness and color in the output images of all of the individual cameras.

According to an embodiment, the pairs of training images contain at least one sequence of consecutive input and output images (as image data). In other words, image sequences (video sequences) are utilized as image data. In this case, at least one input video sequence and one nominal video sequence are required for the machine learning.

When using image sequences, temporal aspects or relationships in the reconstruction (or image correction) can advantageously be taken into account. Raindrops or dirt particles which move over time are indicated as an example. This creates regions in the image which had a clear view at a point in time t and a view disturbed by rain at a point in time t+1. By using image sequences, information in the clear image regions can be used for reconstruction in the fields of view disturbed by rain or dirt.

The temporal aspect can help to reconstruct a clear image, in particular in the case of the regions covered by dirt. In an example, regions of the lens are covered by dirt and other regions are clear. At a point in time t, an object can be seen completely, at another point in time t+1 dirt prevents the object from being acquired completely. By moving the object and/or moving the camera while driving, the information obtained about the object in the image at a point in time t can now help to reconstruct the image at a point in time t+1.

In an embodiment, the artificial neural network has a common input interface for two separate output interfaces. The common input interface has shared feature representation layers. Corrected (i.e., converted) image data are output at the first output interface. ADAS-relevant detections of at least one ADAS detection function are output at the second output interface. ADAS stands for advanced systems for assisted or automated driving (Advanced Driver Assistance Systems). Consequently, ADAS-relevant detections are, e.g., objects, items, road users, which represent important input variables for ADAS/AD systems. The artificial neural network comprises ADAS detection functions, e.g., lane recognition, object recognition, depth recognition (3D estimation of the image components), semantic recognition, or the like. The outputs of both output interfaces are optimized as part of the training.

A method for correcting input image data from a plurality of cameras of a panoramic-view system, which are negatively influenced by rain, incident light and/or dirt, includes the following steps:
a) input image data captured by the cameras, which are negatively influenced by rain, incident light and/or dirt, are provided to a trained artificial neural network,
b) the trained artificial neural network is configured to convert the input image data negatively influenced by rain, incident light and/or dirt into output image data without negative influence and to determine a certainty measure c which is dependent on the degree of wetting by water, incident light and/or contamination for an image or each image of the input image data and characterizes (when utilizing the trained network) the certainty that an image correction by the network is accurate, and
c) the trained artificial neural network is configured to output the output image data and the determined certainty measure c.

The corrected output image data advantageously make possible better machine object recognition on the output image data, e.g., conventional lane/object or traffic sign detection, or an improved stitching (combining the simultaneously captured images from the cameras) and display of the composite image data.

According to an embodiment, the input image data contain at least one sequence (video sequence) of input images captured after one another from the cameras.

In an embodiment, the cameras are vehicle-mounted environment-capturing cameras.

In an embodiment, in step a), a factor d is additionally provided to the trained artificial neural network and, in step b), the (strength or the degree of the) image correction or conversion is controlled as a function of the factor d.

According to an embodiment, the factor d is estimated and the negative influence of the currently captured input image data is taken into account during the estimation. Cumulatively or alternatively, the estimation of the factor d of the currently captured input image data can take into account the factor(s) d of the previously captured image data.

According to an embodiment, a temporal development of the factor d can be taken into account when establishing or estimating the factor d. For this purpose, the temporal development of the factor d and a sequence of input images are included in the estimation. Information about the temporal development of the brightness can also be enlisted for image regions having different factors d.

In an embodiment, a specific factor d is estimated or established for each of the cameras of the panoramic-view system. This makes it possible to convert image data of the individual (vehicle) cameras, individually, in particular as a function of the current negative influence of the image of the respective camera.

According to an embodiment having a vehicle-mounted environment-capturing camera, information about the current surroundings situation of the vehicle is taken into account when establishing the factor d. Information about the current surroundings situation can comprise, for example, rain sensor data, external (V2X data or data from a navigation system, e.g., GPS receiver having a digital map) spatially resolved weather information and/or information regarding the position of the sun, driving situation information (country road, town/city, motorway, tunnel, underpass). This information can (at least partially) also be obtained from the camera image data via image processing.

For example, the current factor d can be estimated based on surroundings situation information and from the temporal order of images and from the history of the factor d.

Consequently, the factor d can be estimated dynamically when utilizing a trained artificial neural network.

In an embodiment, the corrected image data from the vehicle-mounted environment-capturing camera and the determined certainty measure (or the determined certainty measures) c and, optionally, also the factor d are output to at least one ADAS detection function which determines and outputs ADAS-relevant detections. ADAS detection functions can include known edge or pattern recognition methods as well as recognition methods which can recognize and optionally classify relevant image objects by means of an artificial neural network.

In an alternative embodiment, the approach can be extended and the artificial neural network for correcting the image data can be combined with a neural network for ADAS detection functions, e.g., lane recognition, object recognition, depth recognition, semantic recognition. Consequently, hardly any additional outlay in terms of computing time is caused. Following the training, the (first) output interface for outputting the converted (corrected) image data can be eliminated so that when utilized in the vehicle only the (second) output interface is available for the ADAS detections.

In a further embodiment, instead of a reconstruction of unclear or negatively influenced image data, the learned method can be deployed in reverse in order to artificially add rain or dirt from the learned reconstruction profile in acquired image data for a simulation for safeguarding purposes.

In a further embodiment, the learned reconstruction profile can also be enlisted to evaluate the quality of an artificial rain simulation in acquired image data.

According to a further embodiment, the method can be applied in augmented reality and in the field of dash cam and accident recordings.

The present disclosure furthermore relates to an apparatus having at least one data processing unit configured to correct input image data, which are negatively influenced by rain, incident light and/or dirt, from a plurality of cameras of a panoramic-view system, into output image data. The apparatus includes: an input interface, a trained artificial neural network and a (first) output interface.

The input interface is configured to receive input image data which are negatively influenced by rain, incident light and/or dirt, which have been captured by the cameras. The trained artificial neural network is configured to convert the negatively influenced input image data into output image data without negative influence and to output a certainty measure c which is dependent on the degree of wetting by water, incident light and/or contamination for an image or each image of the input image data and characterizes a measure of the certainty of the network in its calculated output or the certainty of the network that the image correction of the network or by the network is accurate.

The (first) output interface is configured to output the converted (corrected) image data and the determined certainty measure(s) c.

According to an embodiment, the input image data contain at least one sequence of input images captured one after another as input image data, and the artificial neural network has been trained with the aid of at least one sequence of consecutive input and output images as image data.

The apparatus or the data processing unit can in particular comprise a microcontroller or processor, a central processing unit (CPU), a graphics processing unit (GPU), a digital signal processor (DSP), an ASIC (Application Specific Integrated Circuit), an FPGA (Field Programmable Gate Array) and more of the same as well as software for performing the corresponding method steps.

According to an embodiment, the data processing unit is implemented in a hardware-based image pre-processing stage (Image Signal Processor, ISP).

In an embodiment, the trained artificial neural network for correcting images is part of an onboard ADAS detection neural network, e.g., for semantic segmentation, lane detection or object detection, having a shared input interface (input or feature representation layers), and two separate output interfaces (output layers), wherein the first output interface is configured to output the converted output image data and the second output interface is configured to output the ADAS detections (image recognition data.

The present disclosure furthermore relates to a computer program element which, when a data processing unit is programmed therewith, instructs the data processing unit to perform a method for correcting images of input image data from a plurality of cameras of a panoramic-view system into output image data.

The present disclosure furthermore relates to a computer-readable storage medium on which such a program element is stored.

The present disclosure furthermore relates to the use of a method for machine learning of an image correction of input image data from a plurality of cameras of a panoramic-view system into output image data for training an artificial neural network of an apparatus having at least one data processing unit.

The present disclosure can, consequently, be implemented in digital electronic circuits, computer hardware, firmware or software.

The main advantages are:
making possible object recognition in the event of a negative influence (e.g., fogging) of individual, multiple or all the cameras of the panoramic-view system;
improving the image quality in the case of lateral satellite, reversing cameras for display purposes when the image is disturbed by water/dirt during driving; and
generating an image data stream for human and computer vision from a neural network for an optimized correspondence search (search for feature correspondence).

In addition to being utilized in motor vehicles, there are various areas of application:
assistance systems in buses, trains, airplanes as well as robotic systems;
all applications of feature-based detection, e.g., detection methods based on optical flow, structure from motion, etc., which experience a dramatic degradation due to missing features in case of negative influences caused by contamination/rain/light;
consequently, in particular, assistance systems which are based on an optical flow in order to search for features; and
online calibration of cameras, which likewise experience a dramatic loss in performance when wet or contaminated due to missing features or low contrast.

BRIEF DESCRIPTION OF THE DRAWINGS

Example embodiments and figures are described in greater detail below, wherein.

DETAILED DESCRIPTION

Figure 1:
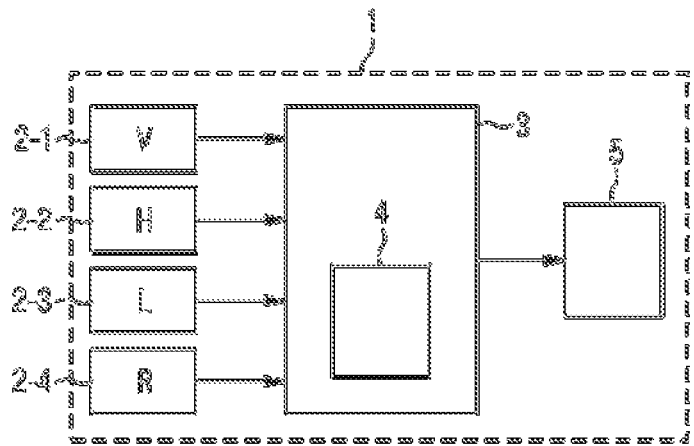
FIG. 1: shows a first schematic representation of an apparatus according to the present disclosure in one configuration.

As can be seen from FIG. 1, an apparatus 1 according to the present disclosure for correcting the images of input image data from multiple cameras of a panoramic-view system can have multiple units or circuit components. In the case of the exemplary embodiment depicted in FIG. 1, the apparatus 1 for correcting images has multiple vehicle cameras 2-$i$ which, in each case, produce camera images or video data. In the case of the exemplary embodiment depicted in FIG. 1, the apparatus 1 has four vehicle cameras 2-$i$ for producing camera images. The number of the vehicle cameras 2-$i$ can vary for different applications. The apparatus 1 according to the present disclosure has at least two vehicle cameras for producing camera images. The camera images of neighboring vehicle cameras 2-i typically have overlapping image regions.

The apparatus 1 contains a data processing unit 3 which combines the camera images produced by the vehicle cameras 2-i to create a composite overall image. As depicted in FIG. 1, the data processing unit 3 has a system for correcting images or converting images 4. The system for converting images 4 produces corrected original or output image data (Opti) without negative influence from the input image data (Ini) of the vehicle cameras (2-i), which are at least partially negatively influenced by rain, incident light and/or dirt. The optimized output image data from the individual vehicle cameras 2-i are combined to create a composite overall image (so-called stitching). The overall image combined by the image processing unit 3 from the corrected image data (Opti) is subsequently displayed to a user by a display unit 5. In one possible embodiment, the system for correcting images 4 is formed by an independent hardware circuit which carries out the image correction. In the case of an alternative embodiment, the system executes program instructions when performing a method for correcting images.

The data processing unit 3 can have one or more image processing processors, wherein it converts the camera images or video data received from the various vehicle cameras 2-i and subsequently combines them to create a composite overall image (stitching). In one possible embodiment, the system for converting images 4 is formed by a processor provided for this purpose, which carries out the image correction in parallel with the other processor or processors of the data processing unit 3. The time required to process the image data is reduced by the parallel data processing.

Figure 2:
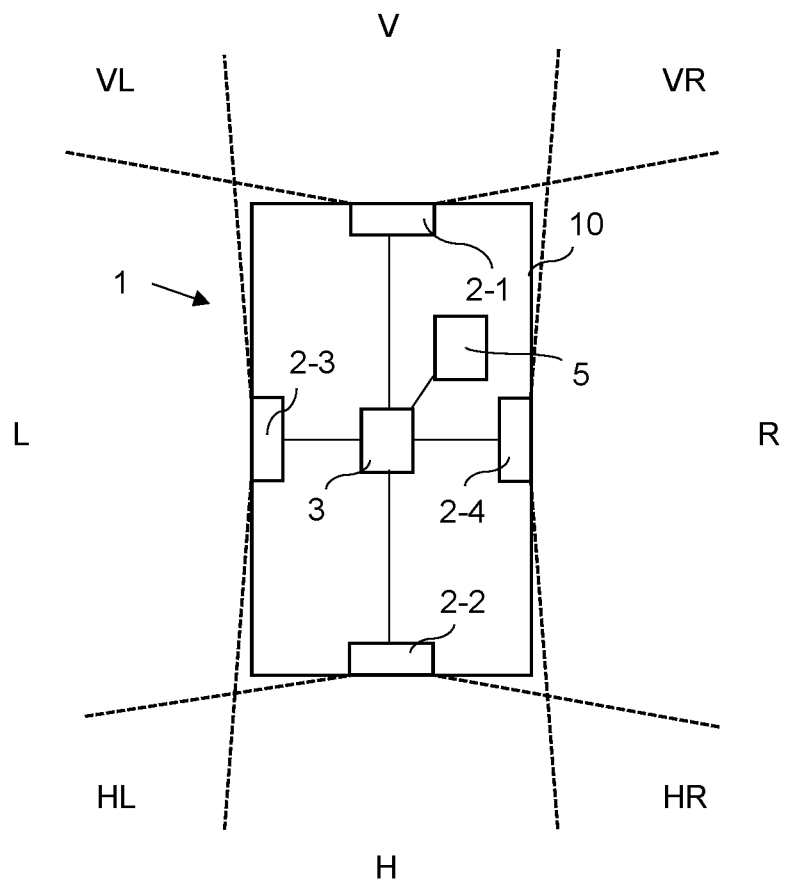
FIG. 2: shows a second schematic representation of an apparatus according to the present disclosure in one configuration in a vehicle.

FIG. 2 shows a further schematic representation of an apparatus 1 according to the present disclosure in one configuration. The apparatus 1 depicted in FIG. 2 is utilized in a surround-view system of a vehicle 10, in particular a car or a truck. In this case, the four different vehicle cameras 2-1, 2-2, 2-3, 2-4 can be located on different sides of the vehicle 10 and have corresponding viewing regions (dashed lines) in front of V, behind H, on the left L and on the right R of the vehicle 10.

For example, the first vehicle camera 2-1 is located on a front side of the vehicle 10, the second vehicle camera 2-2 is located on a rear side of the vehicle the third vehicle camera 2-3 is located on the left side of the vehicle 10 and the fourth vehicle camera 2-4 is located on the right side of the vehicle 10. The camera images from two neighboring vehicle cameras 2-i have overlapping image regions VL, VR, HL, HR. In one possible embodiment, the vehicle cameras 2-i are so-called fisheye cameras which have a viewing angle of at least 185°. The vehicle cameras 2-i can transmit the camera images or camera image frames or video data, in one possible embodiment, via an Ethernet connection to the data processing unit 3. The data processing unit 3 calculates a composite surround-view camera image from the camera images of the vehicle cameras 2-i, which is displayed to the driver and/or a passenger on the display 5 of the vehicle 10. In some cases, the visibility conditions of a camera, e.g., of the rear vehicle camera 2-2 differ from those of the remaining cameras 2-1, 2-3, 2-4, because the lens of the rear vehicle camera 2-2 is wet with rain drops or is contaminated.

When an artificial neural network is simultaneously or jointly trained with negatively influenced images (for example, from the rear-view camera 2-2) and images which are not negatively influenced (for example, from the front 2-1 and side cameras 2-3, 2-4), the neural network learns optimal parameters for the image correction in this situation.

During the joint training for multiple vehicle cameras 2-i, ground truth data which have an image quality applied to all of the target cameras 2-1, 2-2, 2-3, 2-4 without negative influence due to rain, incident light or dirt, are preferably used in a first application. A neural network CNN1, CNN10, CNN11, CNN12 is trained in terms of an optimal set of parameters for the network with the ground truth data as the reference and the input data from the target cameras 2-1, 2-2, 2-3, 2-4, which can have such negative influences.

In a further application, the neural network can be trained for the joint cameras 2-i to the effect that, even in the case of missing training data and ground truth data for one camera, for example one side camera 2-3 or 2-4, the network trains and optimizes the parameters for the camera 2-3 or 2-4 with the missing data based on the training data of the other cameras 2-1, 2-2 and 2-4 or 2-3.

In a final example, the neural network deploys training and ground truth data which differ temporally and which are correlated with the individual cameras 2-i, which have been captured or acquired by the various cameras 2-i at different points in time. To this end, information from features or objects and the ground truth data thereof can be used which have, for example, been acquired at a point in time t by the front camera 2-1 and at a point in time t+n by the side cameras 2-3, 2-4. These features or objects and the ground truth data thereof can replace missing information in the training and ground truth data of the other cameras, in each case, if they are used in the images of the other cameras 2-i and then by the network as training data. In this way, the network can optimize the parameters for all the side cameras 2-3, 2-4 and, if necessary, can compensate for any missing information in the training data.

When using multiple vehicle cameras 2-i, this leads to an adapted image correction for all of the vehicle cameras 2-i, since the individual negative influences are explicitly captured and trained in the overall network.

Figure 3:
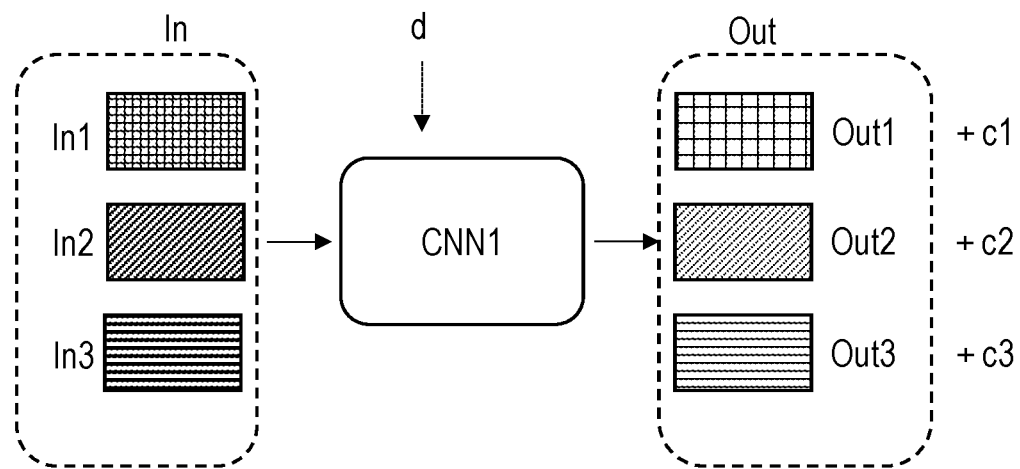
FIG. 3: shows a system for correcting negatively influenced camera images.

FIG. 3 schematically shows a general overview of a system for correcting camera images in case of rain, incident light and/or contamination. An essential component is an artificial neural network CNN1 which learns, in a training phase, to associate a set of corresponding corrected training (nominal) output images Out (Out1, Out2, Out3, . . . ) with a set of training input images In (In1, In2, In3, . . . ). In this context, associating means that the neural network CNN1 learns to generate a corrected image. An input image (In1, In2, In3, . . . ) can contain, e.g., a street scene in the rain, on which only fuzzy or blurred larger objects such as, e.g., a large lane marking representing a bicycle and the sky can be recognized with the human eye. On the corresponding corrected image (Out1, Out2, Out3, . . . ) the contours of a street crossing, a traffic light, a tree and a street lamp can additionally be recognized. Realistic photographic mapping for color images with and without negative influences due to raindrops can be seen, for example, in FIG. 1 of Porav et al. The term "an input image" can, in this case, mean input images captured simultaneously by multiple or all of the individual cameras 2-1, since a plurality of cameras 2-i is indeed present. Accordingly, the term "an output image" can include the nominal output images for multiple or all of the individual cameras 2-i.

A factor d optionally serves as an additional input variable for the neural network CNN1. The factor d is a control parameter which controls the degree of correction for the negative influence (rain, incident light or dirt) of the image.

During training, the factor d can be determined in advance for a pair of images consisting of a training image and a corrected image (In1, Out1; In2, Out2; In3, Out3; ...) or as part of the training from the pair of images (In1, Out1; In2, Out2; In3, Out3; ...) and can be provided to the neural network CNN1. As a result, the factor d can also be learned.

When utilizing the trained neural network CNN1, it is possible to control, by predefining a factor d, the extent to which the neural network CNN1 corrects a currently captured image—the factor d can also be conceived of as an external regression parameter (having any gradation). Since the factor d can be subject to possible fluctuations in the range of +/−10%, this is taken into account during the training. The factor d can exhibit noise of approx. +/−10% during the training (e.g., during the different periods of the training of the neural network) in order to be robust to misestimates of the factor d in the range of approx. +/−10% during the inference in the vehicle. In other words, the necessary accuracy of the factor d is in the range of +/−10%—consequently, the neural network CNN1 is robust to deviations in estimates of this parameter.

Alternatively or additionally, the factor d can be output by the trained neural network CNN1 for an image correction which has been effected. As a result, downstream image recognition or image display functions receive information about the extent to which the originally captured image has been corrected.

The artificial neural network CNN1 is designed in such a way that it determines a certainty measure c which is dependent on the degree of wetting by water, incident light and/or contamination for an input image. The network can be designed, for example, by appropriately designing the architecture of the artificial neural network CNN1. Following the conclusion of the machine learning, the artificial neural network CNN1 can establish and output the certainty measure c for a new input image. That is to say that the certainty measure c is dependent on the degree of negative influence caused by being wetted by rain or water, by incident light and/or by contamination and, when utilizing the trained network, characterizes the certainty that an image correction is accurate. If the term "an input image" means the input images captured simultaneously by multiple or all of the individual cameras 2-$i$, the term "a certainty measure c" can also mean that a specific (possibly different) certainty measure c is determined for each of the various simultaneously captured input images.

In FIG. 3, three pairs of images In1+Out1, In2+Out2, In3+Out3 are depicted schematically. Accordingly, the system has been trained or has been designed by the neural network CNN1 to the effect that it can determine and output a certainty measure c1, c2 or c3 for each input image of a pair of images.

Since the quality of the correction of images having rain, incident light or contamination is dependent on numerous factors (such as, e.g., the presence of a similar case in the training data, sufficient exposure for a possible correction, avoidance of ambiguous scenarios, etc.), in addition to correcting the image, the network outputs a measure of the certainty with which the network makes its decision. This certainty measure c can include one of the following forms of implementation or a combination of these:

A confidence measure c_Prob: in this case, the output of the network is calibrated in such a way that the latter can be interpreted probabilistically as the probability with which the network is making the right decision. Values for this are normalized to a range between [0,1] and these correspond to the range from a probability of 0% to a probability of 100% that the network has calculated a correct correction of an image. The calibration can be effected following the conclusion of the actual machine learning method with the aid of a training image dataset by the subsequent verification of the quality of the learning with the aid of a validation image dataset. The validation image dataset also contains pairs of images of, in each case, a first image which is negatively influenced by rain, incident light and/or dirt and a second image of the same scene without negative influence as a corresponding nominal output image. In practice, part of the input and nominal output images can be retained, i.e., not used for the machine learning process, and subsequently used for validation.

A measure of dispersion similar to a standard deviation c_Dev: in this case, an uncertainty of the network output is estimated in such a way that the latter describes the dispersion of the network output. This can be implemented in different ways. Possibilities for this are the subdivision into measurement and modeling uncertainties. The measurement uncertainty relates to uncertainties which are caused by the input data, e.g., slight disturbances. These can be added to the network via a further output and are trained by changing the error function. The modeling uncertainty relates to uncertainties which are caused by the limited mapping accuracy and generalizability of a network. This relates to factors such as the volume of the training data and the architecture of the network design. The modeling uncertainty can be estimated, e.g., by Monte Carlo Dropout or network ensembles. The modeling uncertainty and the measurement uncertainty can be added together.

A combination of measures of confidence and dispersion

The certainty measure c can be calculated for the entire image, image regions or the individual pixels of the image.

Based on the certainty measure c, the following decisions can be made:
  c_Prob low: the network has a low confidence in its estimate—misestimations occur frequently.
  c_Prob high: the network has a high confidence in its estimate—the image correction is correct in most cases.
  c_Dev low: the dispersion of the image correction of the network is low—consequently, the network predicts a very precise image correction.
  c_Dev high: the estimated dispersion of the image correction, similar to a standard deviation, is high and the output of the network is less precise/less sharp
  a small change in the input data or in the modeling of the network would cause deviations in the image correction
Combinations:
  c_Prob high and c_Dev low: a very reliable and precise image correction which can be accepted with a high degree of certainty
  c_Prob low and c_Dev high: a very uncertain and imprecise image correction which would rather be rejected
  c_Prob high and c_Dev high or c_Prob low and c_Dev low: these corrections are fraught with uncertainties and a judicious use of the image corrections is recommended here.

The addition of the certainty measures is relevant to safety-critical functions, in particular.

One possibility for producing the training data (training images (In1, In2, In3, ...) and associated corrected images (Out1, Out2, Out3, ...) includes acquiring image data with a "stereo camera setup" as described in Porav et al. with reference to FIG. 8 therein: a bi-partite chamber with transparent panels is arranged in front of two identical camera modules located a small distance from one another, the chamber, e.g., in front of the right stereo camera module is sprayed with water drops, while the chamber in front of the left stereo camera module is kept free of negative influences.

In order to simulate a negative influence caused by incident light in a similar manner, a light source can, e.g., only be directed at one chamber, or, in the case of dirt, this can likewise only be mounted on one chamber.

Alternatively, images which are not negatively influenced can be taken to produce the pairs of training images and render the latter poorly with rendering methods which simulate effects of rain, incident light or dirt in the image.

When the neural network CNN1 is trained, an image correction takes place according to the following procedure:

Input image→CNN1

Optional: factor d→CNN1

CNN1→corrected original/output image+certainty measure c.

Figure 4:
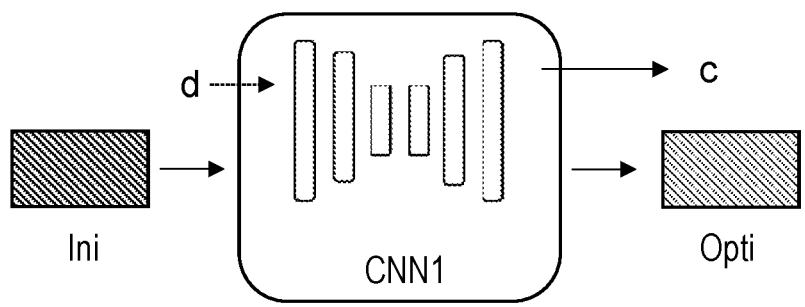
FIG. 4: shows a system having a first neural network for correcting images.

FIG. 4 shows a system having a trained neural network CNN1 for correcting images. The trained neural network CNN1 receives original input image data (Ini) from the multiple cameras 2-$i$ as the input. A factor d can optionally be predefined or established by the neural network CNN1 with the aid of the input image data (Ini), which factor d predefines (controls) how strongly the input image data are to be corrected. The neural network calculates corrected image data (Opti) from the multiple cameras 2-$i$ without negative influences and one or more certainty measure(s) c. The corrected image data (Opti) from the multiple cameras 2-$i$ and the at least one certainty measure c are output.

Figure 5:
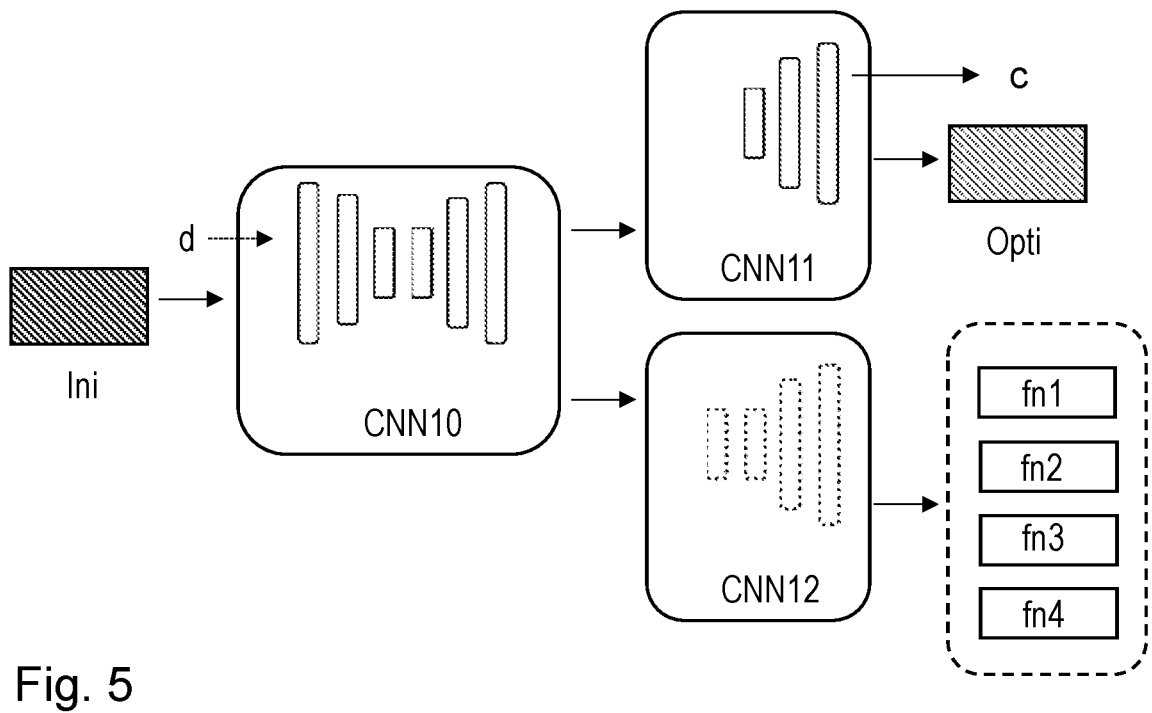
FIG. 5: shows a system having combined image correction and detection functions.
Figure 6:
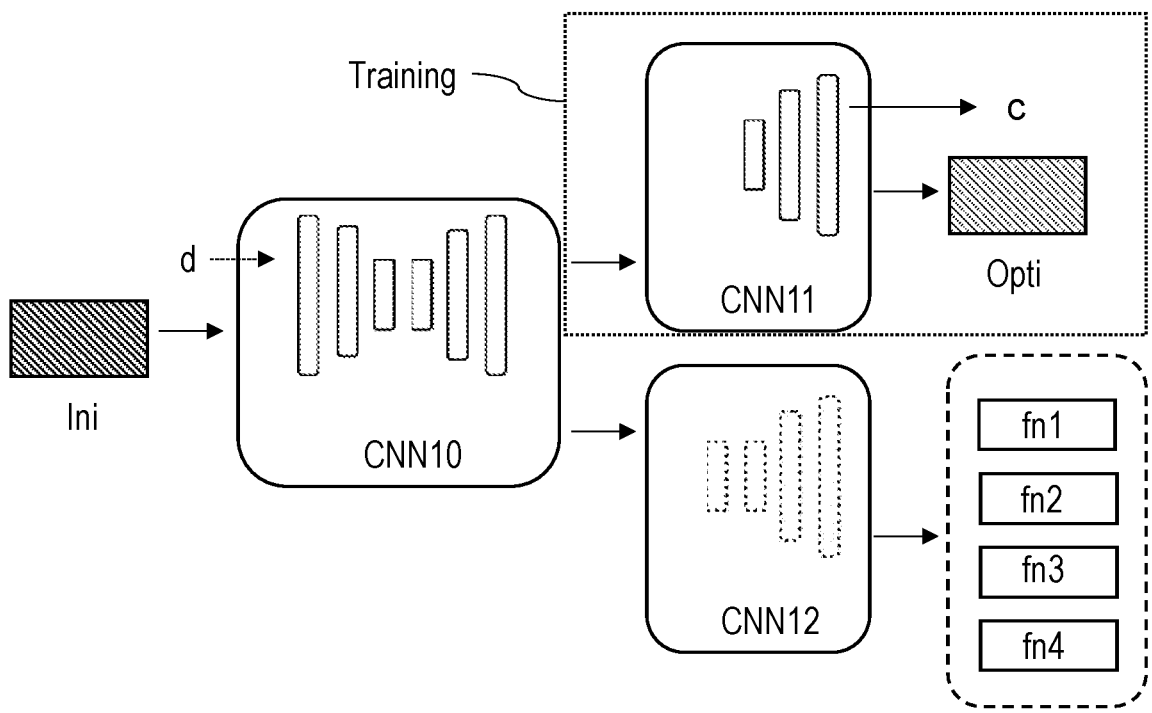
FIG. 6 shows a modified system, in which the image correction is only calculated and output as part of the training.

FIGS. 5 and 6 show example embodiments of possible combinations of a first network for correcting images with one or more networks for (detection) functions for driver assistance systems and/or automated driving.

FIG. 5 shows a neural network CNN10 for the image correction of an input image (Ini), possibly controlled by a factor d, which shares feature representation layers (as input or lower layers) with a network for detection functions (fn1, fn2, fn3, fn4). In this case, the detection functions (fn1, fn2, fn3, fn4) are image processing functions which detect objects, structures, properties (in general: features) relevant to ADAS or AD functions in the image data. Many such detection functions (fn1, fn2, fn3, fn4), which are based on machine learning, have already been developed or are the subject of current development (e.g., traffic sign classification, object classification, semantic segmentation, depth estimation, lane marking recognition and localization). Detection functions (fn1, fn2, fn3, fn4) of the second neural network CNN2 supply better results on corrected images (Opti) than on the original negatively influenced input image data (Ini). Common features for the image correction and for the detection functions are learned in the feature representation layers of the neural network CNN 10.

The neural network CNN10 having shared input layers and two separate outputs has a first output CNN 11 for outputting the corrected original/output image (Opti) as well as a second output CNN 12 for outputting the detections: objects, depth, lane, semantics, etc.

The fact that the feature representation layers are optimized both in terms of the image correction and the detection functions (fn1, fn2, fn3, fn4) during training means that optimizing the image correction simultaneously brings about an improvement in the detection functions (fn1, fn2, fn3, fn4).

If an output of the corrected image (Opti) is then not desired or not required, the approach can be further varied, as explained with reference to FIG. 6.

FIG. 6 shows an approach based on the system of FIG. 5 for the neural network-based image correction by optimizing the features. In order to save computing time, the features for the detection functions (fn1, fn2, fn3, fn4) are optimized during the training in terms of image correction and in terms of the detection functions (fn1, fn2, fn3, fn4).

During the runtime, i.e., when utilizing the trained neural network (CNN10, CNN11, CNN12), no corrected images (Opti) are calculated.

Nevertheless, the detection functions (fn1, fn2, fn3, fn4)—as already explained—are improved by the common training of image correction and detection functions, compared to a system having only one neural network (CNN2) for detection functions (fn1, fn2, fn3, fn4), in which only the detection functions (fn1, fn2, fn3, fn4) have also been optimized in the training.

In the training phase, the corrected image (Opti) is output by an additional output interface (CNN11) and compared to the ground truth (the corresponding corrected training image). In the test phase or during the runtime, this output (CNN11) can continue to be used or, in order to save computing time, can be truncated. During the training with the additional output (CNN11), the weights for the detection functions (fn1, fn2, fn3, fn4) are modified to the effect that they take into account the image corrections for the detection functions (fn1, fn2, fn3, fn4). The weights of the detection functions (fn1, fn2, fn3, fn4) consequently implicitly learn the information about the brightness improvement.

Further aspects and embodiments of an assistance system, which algorithmically converts the image data of the underlying camera system, despite negative influences by rain, incident light or dirt, into a representation which corresponds to an acquisition without the negative influences, are set out below. The converted image can then either serve purely for display purposes or as an input for feature-based recognition algorithms.

1) In a first embodiment, the calculation in a system is based on a neural network, for example, which, located upstream of a detection or display unit, converts an input image with fogging, dirt or water drops with little contrast and color information into a revised representation. For this task, the neural network was trained with a dataset consisting of "fogged input images" and the associated "revised images".

2) In particular, the neural network is trained by using revised images to the effect that features occurring in the pairs of images to be improved are obtained and, at best, even amplified for a later correspondence search or object recognition, despite fogging or dirt.

3) When training the network for image correction/improvement, feature-based methods can be taken into account for display and object detection, so that the method is specialized for the features to be recognized and explicitly highlights these features for subsequent processing.

4) In a further embodiment, the method for improving or correcting images can be integrated in a hardware-based image pre-processing stage, the ISP. This ISP is supplemented by a neural network on the hardware side, which carries out the conversion and makes available the edited information with the original data to possible detection or display methods.

5) In a further embodiment, the system can be trained with the neural network to the effect that it uses additional information from fog-free cameras such as side cameras in order to further improve the conversion for the fogged regions. Here, the network is then individually trained less with individual images for each camera, but rather as an overall system consisting of multiple camera systems.

6) In a further application, information regarding the image quality can be made available to the network for training, in addition to contamination or fogging information. The system and the method can be optimized to the effect that it calculates optimized image data for object recognition and human vision.

7) In further applications, the degree of contamination of the cameras is different. Thus, by way of example, a satellite camera mounted laterally on the vehicle is contaminated to a greater degree than a satellite camera mounted on the front of the vehicle. In this case, the artificial neural network is designed, trained and optimized such that it deploys, for example, the image information and image properties of satellite cameras without fogging in order to calculate a fog-free representation in images from cameras with fogging. The image calculated therefrom can then be deployed for display purposes, but also for recognizing features. In the following examples, the corrected images of fogged-up cameras both serve to recognize features for optical flow or structure from motion as well as for display purposes.

8) In an application, the method is designed in such a way that it simultaneously learns optimal parameters for all satellite cameras with a joint training of an artificial neural network having images with different degrees of contamination (for example, fogging on the side cameras) and clear images (for example, for the front or rear-view cameras).

During the joint training for multiple vehicle cameras, ground truth data, which have an image quality which is applied to all target cameras, are used in a first application. In other words, the ground truth data for all target cameras are balanced out in such a way that, for example, no brightness differences can be recognized in the ground truth data in the case of a surround-view application. A neural network is trained in terms of an optimal set of parameters for a network with the ground truth data as a reference and the input data of the target cameras, which can have different levels of fogging. Data having differently illuminated side regions, for example if the vehicle is located next to a streetlight, or the vehicle has an additional light source on one side, are likewise conceivable.

9) In a further application, the network can be trained for the joint cameras to the effect that, even in the case of missing training data and ground truth data for one camera, for example one side camera, the network trains and optimizes the parameters for the camera having the missing data based on the training data of the other cameras. This can be achieved, for example, as a restriction in the training of the network, for example as an assumption that the correction and training must always be the same due to the similar image quality of the side cameras.

10) In a final example, the neural network deploys training and ground truth data which differ temporally and which are correlated with the cameras, which have been acquired by the various cameras at different points in time. To this end, information from features and the ground truth data thereof can be used which have, for example, been acquired at a point in time t by the front camera and at a point in time t+n by the side cameras. These features and the ground truth data thereof can replace missing information in the training and ground truth data of the other cameras, in each case, if they are used in the images of the other cameras and then by the network as training data. In this way, the network can optimize the parameters for all the side cameras and, if necessary, can compensate for any missing information in the training data.

When using multiple vehicle cameras 2-$i$, this leads to an adapted image quality for all of the vehicle cameras 2-$i$, since the individual fogging profiles in the outdoor space are explicitly captured and trained in the overall network.

11) In addition to correcting images in the event of fogging or water drops, the system recognizes water drops or dirt for, for example, activating the windscreen wipers or the display to request that a satellite camera be cleaned. In addition to correcting the images, a rain light detection function can be realized in this way, together with brightness detection.

The invention claimed is:

1. A method for machine learning of an image correction of input image data from a plurality of cameras of a panoramic-view system, wherein the input image data are at least partially influenced by at least one of rain, incident light or dirt on a lens of at least one of the cameras, into corrected output image data by an artificial neural network, wherein the machine learning is effected with a multiplicity of pairs of training images in such a way that, in each case, a first image of the input image data with the influence by the at least one of rain, incident light or dirt is provided at the input of the artificial neural network and a second image of the same scene without the influence by the at least one of rain, incident light or dirt is provided as a nominal output image,
wherein the artificial neural network is configured in such a way that the artificial neural network determines a certainty measure which is dependent on a degree of at least one of wetting by water, incident light or contamination for an input image, and
following a conclusion of the machine learning, the artificial neural network is configured to establish and output the certainty measure for a new input image,
wherein the pairs of training images contain at least one sequence of consecutive input and output images.

2. The method according to claim 1, wherein the pairs of training images are produced in that, in each case, the first image influenced by the at least one of rain, incident light dirt and the second image without the influence are captured simultaneously or immediately after one another.

3. The method according to claim 1, wherein the artificial neural network is trained jointly for all of the cameras.

4. The method according to claim 1, wherein the cameras are vehicle-mounted environment-capturing cameras and the trained artificial neural network for correcting images is part of an onboard advanced driver assistance systems (ADAS) detection neural network having a shared input interface and two separate output interfaces, wherein the first output interface is configured to output the corrected output image data and the second output interface is configured to output ADAS-relevant detections.

5. A method for correcting input image data from a plurality of cameras of a panoramic-view system, which are negatively influenced by at least one of rain, incident light or dirt on a lens of one or more of the cameras, comprising:
capturing input image data by the cameras, which are influenced by the at least one of rain, incident light and/or dirt on a lens of one or more cameras, and providing the input image data to a trained artificial neural network,
converting, by the trained artificial neural network, the input image data influenced by the at least one of rain, incident light or dirt into corrected output image data without the negative influence, and determining a certainty measure which is dependent on a degree of at least one of wetting by water, incident light or contamination for an image of the input image data and characterizing a certainty of the trained artificial neural network that image correction of the trained artificial neural network is accurate, and outputting, by the trained artificial neural network, the output image data and the determined certainty measure, wherein the input image data contain at least one sequence of input images captured one after another.

6. The method according to claim 5, wherein the cameras are vehicle-mounted environment-capturing cameras.

7. The method according to claim 6, wherein the converted image data and the determined certainty measure are output to at least one advanced driver assistance systems (ADAS) detection function which determines and outputs ADAS-relevant detections based on the converted image data.

8. The method according to claim 5, wherein the cameras are vehicle-mounted environment-capturing cameras and the trained artificial neural network for correcting images is part of an onboard advanced driver assistance systems (ADAS) detection neural network having a shared input interface and two separate output interfaces, wherein the first output interface is configured to output the corrected output image data and the second output interface is configured to output ADAS-relevant detections.

9. The method according to claim 5, wherein the input image data contain at least one sequence of input images captured one after another as input image data, and the trained artificial neural network has been trained with at least one sequence of consecutive input and output images.

10. An apparatus having at least one data processing unit configured to correct input image data from a plurality of cameras of a panoramic-view system, which are influenced by at least one of rain, incident light on dirt on a lens of one or more of the cameras, into corrected output image data, the apparatus comprising:

an input interface which is configured to receive the input image data, which are influenced by the at least one of rain, incident light or dirt on a lens of one or more of the cameras, from the cameras, a trained artificial neural network which is configured to convert the input image data into corrected output image data without the negative influence, determine a certainty measure which is dependent on a degree of wetting by at least one of water, incident light or contamination for an image of the input image data, and characterize a certainty of the trained artificial neural network that image correction of the trained artificial neural network is accurate, and a first output interface which is configured to output the corrected output image data and the determined certainty measure, wherein the input image data contain at least one sequence of input images captured one after another.

11. The apparatus according to claim 10, wherein the data processing unit is implemented in a hardware-based image pre-processing stage.

12. The apparatus according to claim 10, wherein the cameras are vehicle-mounted environment-capturing cameras and the trained artificial neural network for correcting images is part of an onboard advanced driver assistance systems (ADAS), detection neural network having a shared input interface and two separate output interfaces, wherein the first output interface is configured to output the corrected output image data and the second output interface is configured to output ADAS-relevant detections.

13. The apparatus according to claim 10, wherein the input image data contain at least one sequence of input images captured one after another as input image data, and the trained artificial neural network has been trained with at least one sequence of consecutive input and output images.

14. Use of a method according to claim 1 for training an artificial neural network of an apparatus according to claim 10.

15. The apparatus according to claim 10, wherein the converted image data and the determined certainty measure are output to at least one advanced driver assistance systems (ADAS) detection function which determines and outputs ADAS-relevant detections based on the converted image data.

16. A computer program maintained in a non-transitory computer-readable storage medium such that when a data processing unit is programmed with the computer program, the data processing unit performs, a method according to claim 5.

17. The non-transitory computer-readable storage medium on which the computer program according to claim 16 is stored.

* * * * *